United States Patent

Peuterbaugh

[11] 4,033,207
[45] July 5, 1977

[54] GENERATING HEAD STRUCTURE

[75] Inventor: Bruce G. Peuterbaugh, Mount Clemens, Mich.

[73] Assignee: J. P. Tool, Inc., Warren, Mich.

[22] Filed: Dec. 3, 1975

[21] Appl. No.: 637,300

[52] U.S. Cl. ............................. 82/2 E; 279/121; 408/170

[51] Int. Cl.² ..................... B23B 29/034

[58] Field of Search .......... 408/161, 168, 169, 170, 408/171, 146, 153, 158, 159; 82/2 E, 1.2; 279/121

[56] References Cited

UNITED STATES PATENTS

| | | | |
|---|---|---|---|
| 1,786,147 | 12/1930 | Bullard | 279/121 |
| 2,247,283 | 6/1941 | Young | 408/169 X |
| 2,365,549 | 12/1944 | Haynes | 82/1.2 |
| 2,490,397 | 12/1949 | Aked | 408/168 |
| 3,228,265 | 1/1966 | Stoddard et al. | 408/158 |
| 3,728,037 | 4/1973 | Benjamin et al. | 408/168 |

Primary Examiner—Othell M. Simpson
Assistant Examiner—Z. R. Bilinsky
Attorney, Agent, or Firm—Whittemore, Hulbert & Belknap

[57] ABSTRACT

Generating head structure including a generally cylindrical housing having a bore extending therethrough axially of the axis of generation thereof, a slide positioned across the bore at one end of the housing, keeper plates secured to the housing at the one end thereof for providing a slideway for said slide to move transversely of the axis of generation of the housing, a drawbar extending into the other end of the housing through the bore therein, and a cam key acting between the drawbar and slide for moving the slide transversely of the housing on axial movement of the drawbar within the bore, which cam key is provided with a cylindrical pivot portion, and a generally rectangular portion having beveled opposite corners whereby the cam key is self aligning in a slot in one of the drawbar and slide.

A lubricating fitting is also provided extending into the housing and the slide is provided with lubricating grooves in the surfaces thereof. Positive stop means are provided to limit movement of the drawbar into and out of the bore in the housing. In addition, adjustable stop means are provided to limit movement of the slide transversely of the axis of generation of the housing.

5 Claims, 5 Drawing Figures

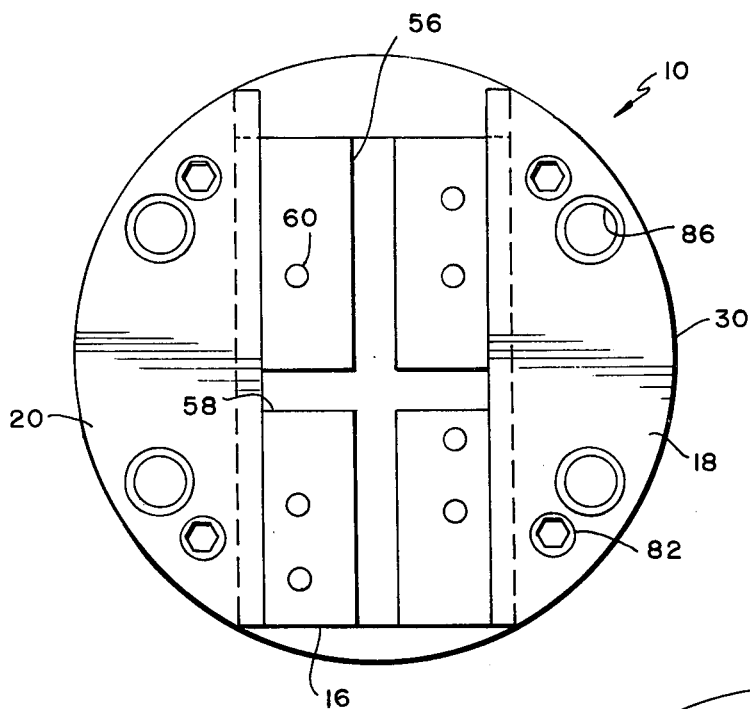
FIG. 3
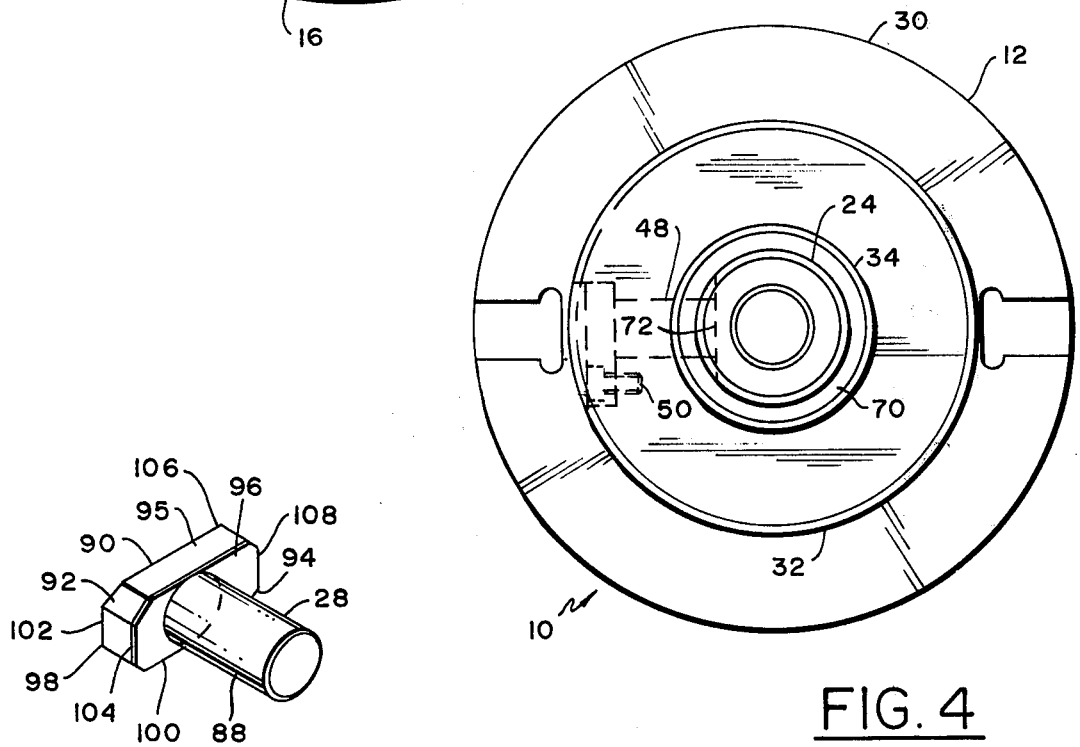
FIG. 4
FIG. 5

GENERATING HEAD STRUCTURE

BACKGROUND OF THE INVENTION

1. Field of the Invention

The invention relates to generating head structure and refers more specifically to a generating head wherein a slide is caused to move transversely of a rotating housing by means of a drawbar moving axially with respect to the axis of rotation of the housing wherein a cam key is used to transmit motion between the drawbar and slide, which cam key includes a cylindrical pivot portion and a rectangular portion having beveled edges thereon whereby the rectangular portion of the cam key is self-aligning in a slot provided therefor in the drawbar and wherein lubricating means for the slide and positive stops for the drawbar and slide are provided in the generating head.

2. Description of the Prior Art

Generating head assemblies have been known in the past wherein a slide is caused to move transversely of a housing with respect to an axis of rotation of the housing by means of a drawbar moving in a bore extending axially of the axis of rotation of the housing. Movement has been transferred between the drawbars of past generating head structures and the slides thereof by a plurality of means as, for example, a single cylindrical pin. Such pins are not, however, as suitable for maintaining dimensional tolerances as a rectangular key moving in a keyway would be. Rectangular keys moving in slots or keyways have been used in generating head structures of the past. However, with such structure, difficulty has been encountered in alignment of the rectangular keys in the keyways. Thus, generating head structures of the past have been deficient in requiring more maintenance than necessary and in requiring more assembly time than necessary.

SUMMARY OF THE INVENTION

In accordance with the invention there is provided a generating head including a housing having an axis of rotation and a bore therethrough extending axially of the axis of rotation, a slide positioned at one end of the bore, keeper plates secured to the housing at the one end of the bore for providing a slideway for the slide to move transversely of the axis of rotation of the housing, a drawbar extending into the bore in the housing having a slot therein extending obliquely to the axis of rotation of the housing and a cam key having a cylindrical portion pivotally mounted in the slide and a rectangular key portion having beveled opposite ends positioned in the keyway whereby the cam key is self-aligning in the keyway by pivoting about the cylindrical pivot part thereof secured in the slide.

A positive stop is provided operable between the housing and the drawbar limiting movement of the drawbar into and out of the bore in the housing. Adjustable stops are also provided in the housing for engaging the slide as it moves transversely of the axis of rotation of the housing to set the limits of movement of the slide.

A lubricating fitting is provided extending transversely through the housing and the slide is provided with sealing grooves at the ends thereof having sealing means therein to prevent leakage of lubricant from the generating head. The slide is further provided with lubricating grooves on the inner surface thereof and on two parallel sides. The slide is also provided with an axially extending portion with respect to the axis of rotation of the housing having a lubricating slot extending diagonally thereacross which further aids in the lubricating of the slide in its transverse movement with respect to the axis of generation of the housing.

BRIEF DESCRIPTION OF THE DRAWINGS

FIG. 3 is an end view of the generating head structure illustrated in FIGS. 1 and 2, taken in the direction of arrow 3 in FIG. 2.

FIG. 4 is a partial end view of the generating head structure illustrated in FIGS. 1 and 2 taken in the direction of arrow 4 in FIG. 2.

FIG. 5 is a perspective view of the cam key of the generating head structure illustrated in FIGS. 1 through 4.

DESCRIPTION OF THE PREFERRED EMBODIMENT

Figure 1:
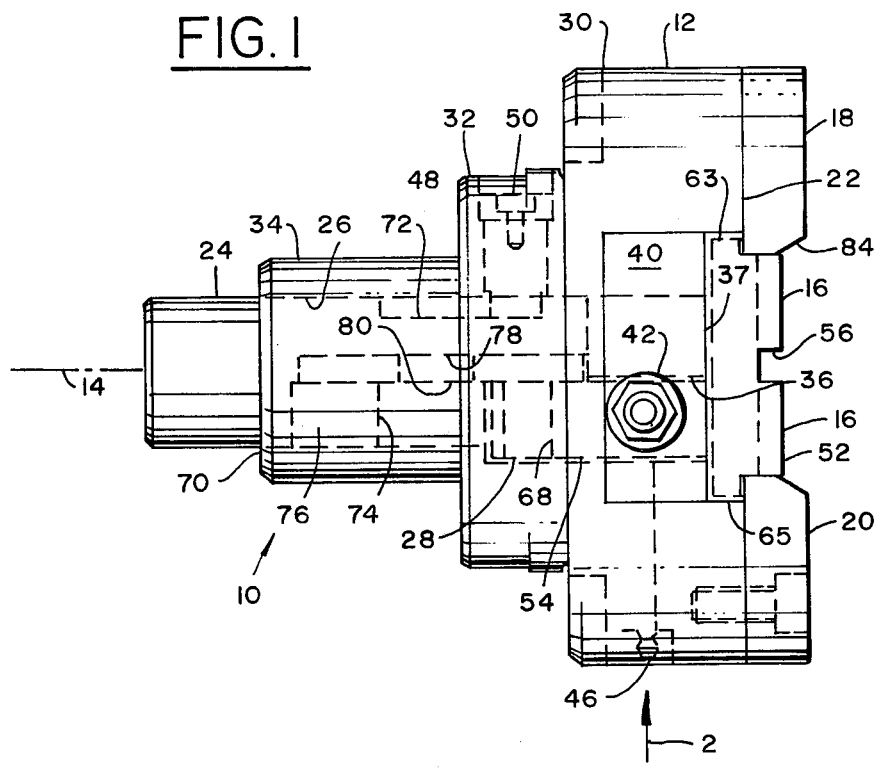
FIG. 1 is an elevational view of the generating head structure of the invention in the direction of arrow 1 in FIG. 2.
Figure 2:
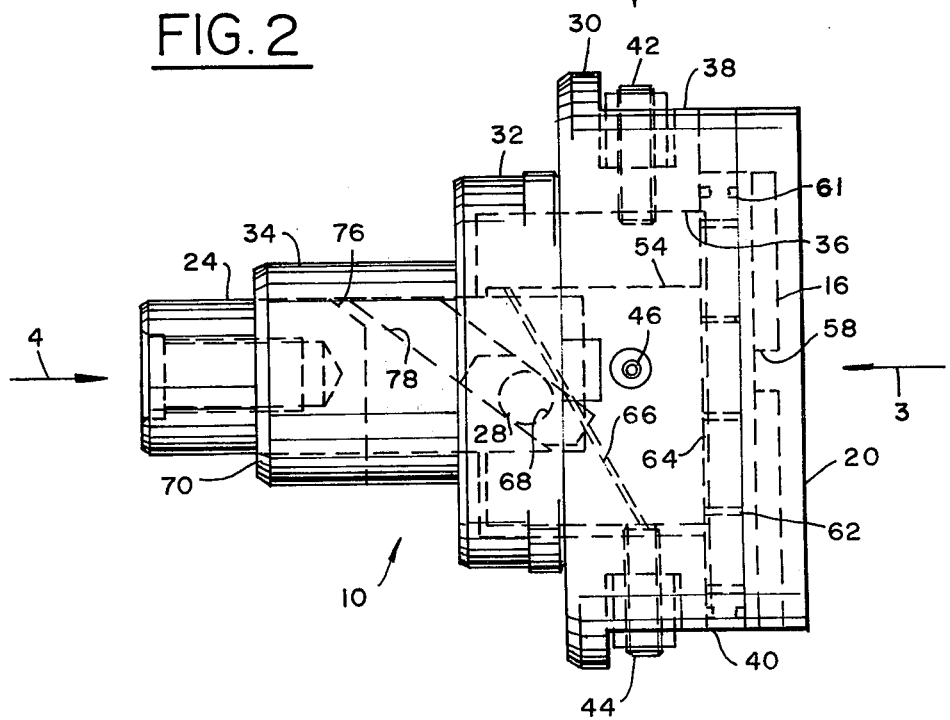
FIG. 2 is another elevation view of the generating head structure of the invention, taken at substantially 90 degrees to the elevation view of FIG. 1 in the direction of arrow 2 in FIG. 1.

As shown best in FIGS. 1 and 2, the generating head structure 10 of the invention includes a housing 12 having an axis of rotation 14, a slide 16 positioned at one end of the housing 12 and keeper plates 18 and 20 secured to the one end 22 of the housing 12 to form a slideway for the slide 16 in conjunction with the housing 12. A drawbar 24 extends axially through a bore 26 in the housing 12. A cam key 28 is provided operable between the slide 16 and drawbar 24 to move the slide 16 transversely of the housing 12 with respect to the axis of rotation 14 within the slideway provided between the keeper plates 18 and 20 and the housing 12 on axial movement of the drawbar 24 within the bore 26.

More specifically, the housing 12 is generally cylindrical and has three external diameters 30, 32 and 34. Internally the housing 12 has a bore 26 extending axially therethrough on the axis of the rotation thereof. Further, the housing 12 has a slot 36 therein extending through slideway surface 37 which crosses the bore 26 for substantially half the diameter of the bore 26 as shown best in FIG. 1. Flat surfaces 38 and 40 are machined on the housing 12 through which adjustable abutment screws 42 and 44 extend into the slot 36. A grease fitting 46 also extends transversely through the housing 12 into the slot 36 as shown best in FIG. 1. Positive top 48 extends through the central portion of the housing 12 into the bore 26. The positive stop 48 is locked in place by means of the locking screw 50.

The slide 16 includes a generally rectangular base portion 52 and a generally rectangular portion 54 extending axially of the axis of rotation of the housing 12. The base portion 52 is provided with flanges 63 and 65 at opposite sides thereof which guide the slide 16 in movement transversely of the housing 12 between the keeper plates 18 and 20 and the housing 12 as shown best in FIG. 1.

As shown best in FIG. 3, the slide 16 is provided with rectangular slots 56 and 58 extending at right angles to each other in the top of the slide. The slots 56 and 58 in conjunction with the threaded openings 60 in the slide 16 permit fastening of cutting tools to the generating head structure 10 as required.

Slide 16 is further provided with a sealing groove 61 at each end thereof including sealing material therein for preventing lubricating fluid from leaking from the generating head. Lubricating grooves 62 extending at right angles to each other are also provided over the inner surface 64 and side surfaces of the flanges 63 and 65 of the slide 16. An additional lubricating groove 66 is provided extending obliquely to the axis of rotation of the housing 12 on the axially extending portion 54 of the slide 16.

A circular opening 68 is further provided in the axially extending portion 54 of the slide 16. The circular opening 68 pivotally mounts the cylindrical portion 88 of the cam key 28 with the cam key 28 in assembly therewith as shown in FIGS. 1 and 2.

The drawbar 24 as shown is cylindrical and extends into the bore 26 from the end 70 of the housing 12. A recess 72 is machined in one side of the drawbar 24 which cooperates with the positive stop 48 to limit the axial movement of the drawbar 24 within the bore 26. The other side of the drawbar 24 is terminated at the surface 74 to receive the portion 54 of the slide 16 on axial movement of the drawbar 24 into the bore 26 of the housing 12. A bevel surface 76 provides a transition between the transverse surface 74 and the cylindrical surface of the rest of the drawbar 24. The surface 76 is at the same angle as a keyway 78 which is generally rectangular in cross section and is machined in the surface 80 of the drawbar 24.

The keeper plates 18 and 20 are identical and are circular portion as shown best in FIG. 3. The keeper plates are secured to the housing 12 by bolts 82 and have beveled edges 84 as shown. Openings 86 extend through the keeper plates 18 and 20 as well as through the housing 12 to permit securing of the generating head structure 10 to a boring machine spindle or the like by bolts passing through the openings 86.

The cam key 28 shown best in FIG. 5 includes the generally cylindrical portion 88 and the rectangular portion 90. The opposite corner 92 and 94 of the rectangular portion 90 of the cam key 28 are beveled as shown. Further, the four parallel edges 95, 96, 98 and 100 of the rectangular portion 90 are beveled along with the four parallel edges 102, 104, 106 and 108.

Thus, in operation with the cam key 28 pivotally mounted in the axially extending portion 54 of the slide 16 the rectangular portion 90 of the cam key 28 will automatically align itself in the keyway 78 on axial movement of the drawbar 24 in bore 26. The automatic aligning of the rectangular portion 90 of the cam key 28 is provided by the pivotal mounting of the cam key 28 by the cylindrical portion 88 thereof within the opening 68 in the axially extending portion 54 of the slide 16.

In overall operation of the generating head 10 with a required tool secured in the slots 56 and 58 on the slide 16 and with the generating head structure 10 assembled as shown best in FIGS. 1 and 2 and secured to the spindle of a boring machine, the drawbar 24 may be moved axially into the bore 26 or out of the bore 26 within a limit set by the positive stop 48. The slide 16 is thus moved transversely of the axis of the rotation of the housing 12 guided by the keeper plates 18 and 20 between the stops 42 and 44 by the camming action of the cam key 28 riding in the keyway 78.

When necessary, the generating head 10 can, of course, be lubricated through the lubricating fitting 46 and through the lubricating grooves 62 and 66 on the slide 16. The sealing material in the grooves 61 prevent escape of the lubricant from the generating head 10 as previously indicated.

While one embodiment of the present invention has been considered in detail, it will be understood that other embodiments and modifications thereof are contemplated by the inventor. It is the intention to include all modifications and embodiments as are defined by the appended claims within the scope of the invention.

What I claim as my invention is:

1. Generating head structure comprising a housing having an axis of rotation, a bore through said housing on the axis of rotation thereof, a slot extending transversely of one end of the bore radially enlarging the bore in one transverse direction, a slideway channel for receiving a slide over one end of the bore in the housing extending in the one transverse direction, a slide positioned over the one end of the bore in the channel having guide flanges on the opposite sides thereof extending in the direction of the channel, said slide further including a rectangular portion extending in the direction of the bore and in the direction of the slot across the one end of the bore and offset to one side of the axis, an opening through the rectangular portion of the slide adjacent the inner end of the slot across the one end of the bore, and means for securing a cutting tool to the slide on the surface thereof away from the one end of the bore, circular segment keeper plates secured to the one end of the housing having a straight side, which plates are removably connected to the one end of the housing and which straight side extends over the channel in the housing for securing the slide within the housing for transverse movement relative to the bore through the housing in the channel, a drawbar extending into the housing through the other end of the bore, the inner end of which has a circular segment cross section limited to the other side of the axis of the housing from the rectangular portion of the slide, which drawbar includes a flat face adjacent the axis having a cam channel extending diagonally of the drawbar and bore therein adjacent the rectangular portion of the slide, and a cam key including a cylindrical portion positioned within the opening through the rectangular portion of the slide and a rectangular portion positioned within the diagonal cam channel in the drawbar wherein on axial movement of the drawbar into and out of the other end of the bore in the housing the rectangular portion of the cam key is caused to move in the cam channel of the drawbar to produce movement of the slide transversely of the one end of the bore in the body member through the cam key.

2. Structure as set forth in claim 1, wherein the rectangular portion of the cam key includes beveled transverse edges thereon at opposite ends thereof on opposite sides of the rectangular portion of the cam key whereby the cam key may be readily aligned in assembly on rotation of the cylindrical portion of the cam key in the opening in the slide on insertion of the beveled end of the rectangular portion of the cam key in the cam slot in the drawbar.

3. Structure as set forth in claim 1 and further including a lubricating fitting extending into the housing transversely of the axis of rotation thereof in close proximity to the rectangular portion of the slide, a lubricating groove extending diagonally of the bore through the housing and diagonally of the rectangular portion of the slide and further lubricating grooves extending over the bottom and flanges of the slide in a rectangular grid.

4. Structure as set forth in claim 1 and further including a flat surface on opposite sides of the housing extending transversely of the slot in the housing, and adjustable screw stops extending from the flat surface into the end of the slot for engagement with the ends of the rectangular portion of the slide to limit movement of the slide in opposite directions on movement of the drawbar within the housing 5. Structure as set forth in claim 1 and further including an axially extending slot in the boring bar, a transverse opening through the housing into the bore through the housing in alignment with the slot in the drawbar, a positive stop in the transverse opening having an inner and extending into the slot in the boring bar, and a locking screw secured in the housing and engaged with the stop for securing the stop in the transverse opening whereby the movement of the drawbar within the bore in the housing is limited.

* * * * *